United States Patent
Ho (10) Patent No.: US 7,974,647 B2
(45) Date of Patent: Jul. 5, 2011

(54) MOBILE APPARATUS AND METHOD OF TIMING SYNCHRONIZATION

(75) Inventor: Wen Hsien Ho, Kaohsiung County (TW)

(73) Assignee: Mediatek Inc., Hsin-Chu (TW)

( * ) Notice: Subject to any disclaimer, the term of this patent is extended or adjusted under 35 U.S.C. 154(b) by 665 days.

(21) Appl. No.: 12/121,902

(22) Filed: May 16, 2008

(65) Prior Publication Data

US 2009/0286564 A1 Nov. 19, 2009

(51) Int. Cl.
*H04B 7/00* (2006.01)
*H04B 15/00* (2006.01)

(52) U.S. Cl. ..................................... 455/502

(58) Field of Classification Search ................... 455/502
See application file for complete search history.

(56) References Cited

U.S. PATENT DOCUMENTS

5,428,820 A 6/1995 Okada et al.
6,473,607 B1 10/2002 Shohara et al.

*Primary Examiner* — Duc Nguyen
*Assistant Examiner* — Ankur Jain
(74) *Attorney, Agent, or Firm* — Thomas|Kayden (57) ABSTRACT

A mobile apparatus and method of timing synchronization. The mobile apparatus comprises a timing synchronization controller, a frame detector, a decoder, and a clock generator. The timing synchronization controller determines a number of times of the mobile station clock switching from a first clock speed to a second clock speed, and compares the number of times of the mobile station clock switching the clock speed with a predetermined number of clock speed switch. The frame detector, coupled to the timing synchronization controller, receives a control channel block when the number of times of clock speed switch reaches the predetermined number of clock speed switch. The decoder, coupled to the frame detector, decodes the control channel block to compute a timing error between the base station clock and the mobile station clock. The clock generator, coupled to the decoder, receives the timing error to compensate for the mobile station clock.

14 Claims, 6 Drawing Sheets

MOBILE APPARATUS AND METHOD OF TIMING SYNCHRONIZATION

BACKGROUND OF THE INVENTION

1. Field of the Invention

The invention relates in general to wireless communication, and in particular, to timing synchronization in wireless communication systems.

2. Description of the Related Art

Wireless communication systems provide voice, video, data, and signaling communication services that are widely used. For example, European Telecommunication Standard Institute (ETSI) has specified a Global Standard for Mobile Communication (GSM) that uses time division multiple access (TDMA) over radio frequency (RF) channels.

The wireless communication systems cover a geographical area that is subdivided into communication cells served by at least one base station, which together provide communication coverage to a service area. The base station communicates with mobile stations over downlink and uplink RF channels to provide the wireless communication service. The RF channels are subdivided into a number of time slots or logical channels during which data bits having various burst formats are communicated. GSM specification defines these formats as: normal burst (NB), access burst (AB), frequency correction bursts (FB), synchronization burst (SB), and dummy burst. Voice, video, and text data are communicated by the NB data bursts in designated as traffic channels (TCH). Signaling data pertaining to call management within the system are communicated over control channels using one of the NB, SB or FB burst. The remaining data bursts incorporate training sequences that are used by an equalizer to adjust the transmitted data bits at the mobile station.

The mobile station may be a cellular phone, a notebook computer, or a personal digital assistant (PDA) that employs portable power storage cells such as batteries, with inherently limited storage capacity, require effective power management solution. In one example of the power management solution, the mobile station uses a low clock speed when inactive, referred to as power saving mode, and a high clock speed during normal mobile station operation, known as normal operation mode. The employment of the low clock speed effectively reduce power usage for the mobile apparatus, however, there is a timing error generated every time when exiting the power saving mode as the mobile station switches from a low clock speed to a high clock speed. The mobile station exits the power saving mode when receiving paging information, detecting signal strength or synchronization burst broadcast from neighboring cells, or running applications such as screen saver, Bluetooth, and WIFI connections. When the mobile station executes an application, for example, screen saver, frequently switching between two clock speeds may cause the accumulated timing error to exceed the timing offset tolerance before receiving a next paging data block and performing timing synchronization. The computing processor, such as a digital signal processor (DSP), is unable to performing pattern matching to detect the training sequence if the accumulated timing error exceeds the timing offset tolerance. A solution to this timing error problem is to disable the power saving mode when any of the applications that causes switching between two clock speeds is activated.

BRIEF SUMMARY OF THE INVENTION

A detailed description is given in the following embodiments with reference to the accompanying drawings.

A method of timing synchronization between a base station clock in a base station and a mobile station clock in a mobile station is disclosed, comprising determining a number of times of the mobile station clock switching from a first clock speed to a second clock speed, comparing the number of times of the mobile station clock switching with a predetermined number of clock speed switch, receiving a control channel block when the number of times of clock speed switch reaches the predetermined number of clock speed switch, decoding the control channel block to determine a timing error between the base station clock and the mobile station clock, and compensating the timing error for the mobile station clock.

In accordance of another aspect of the invention, a mobile apparatus capable of performing timing synchronization to a base station is provided, comprising a timing synchronization controller, a frame detector, a decoder, and a clock generator. The timing synchronization controller determines a number of times of the mobile station clock switching from a first clock speed to a second clock speed, and compares the number of times of the mobile station clock switching the clock speed with a predetermined number of clock speed switch. The frame detector, coupled to the timing synchronization controller, receives a control channel block when the number of times of clock speed switch reaches the predetermined number of clock speed switch. The decoder, coupled to the frame detector, decodes the control channel block to compute a timing error between the base station clock and the mobile station clock. The clock generator, coupled to the decoder, receives the timing error to compensate for the mobile station clock.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
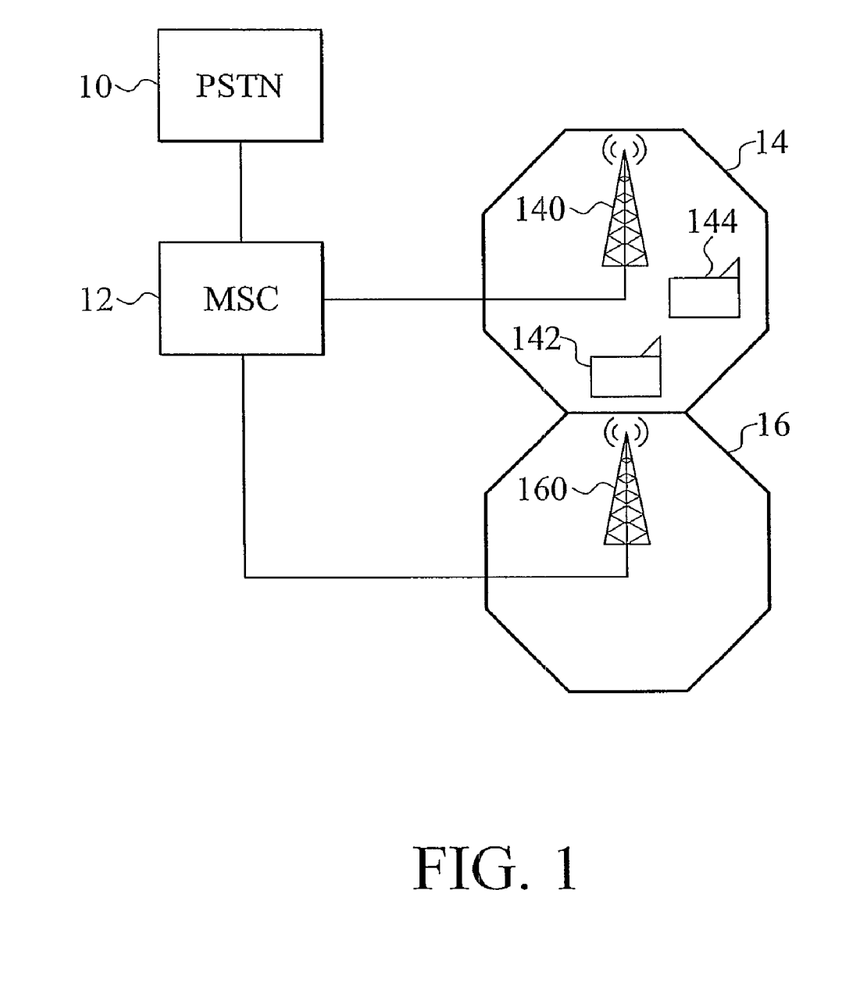
FIG. 1 is a block diagram of an exemplary wireless telecommunication system preferably incorporating the present invention.

FIG. 1 is a block diagram of an exemplary wireless telecommunication system preferably incorporating embodiments of the present invention, comprising a public switching telephone network (PSTN) 10, a Mobile Service Switching Centers (MSC) 12, and base station coverage 14 and 16. The PSTN 10 is coupled to the MSC 12, and subsequently to base station coverage 14 and 16.

In the exemplary embodiment, the wireless telecommunication is a GSM system, the base station coverage 14 and 16 are provided by base stations 140 and 160 to offer telecommunication services to mobile phones 142 and 144. MSC 12 routes telephone calls that may be voice or data messages from a call source to a call destination through PSTN 10. Base stations 140 and 160 allocate uplink or downlink RF channels for providing call services to the mobile phones in the coverage area.

Although the embodiment is directed to the GSM system, those skilled in the art would appreciate that the invention is applicable to other telecommunication system, including IS-136, CDMA, and D-AMPS based wireless telecommunication systems.

Figure 2:
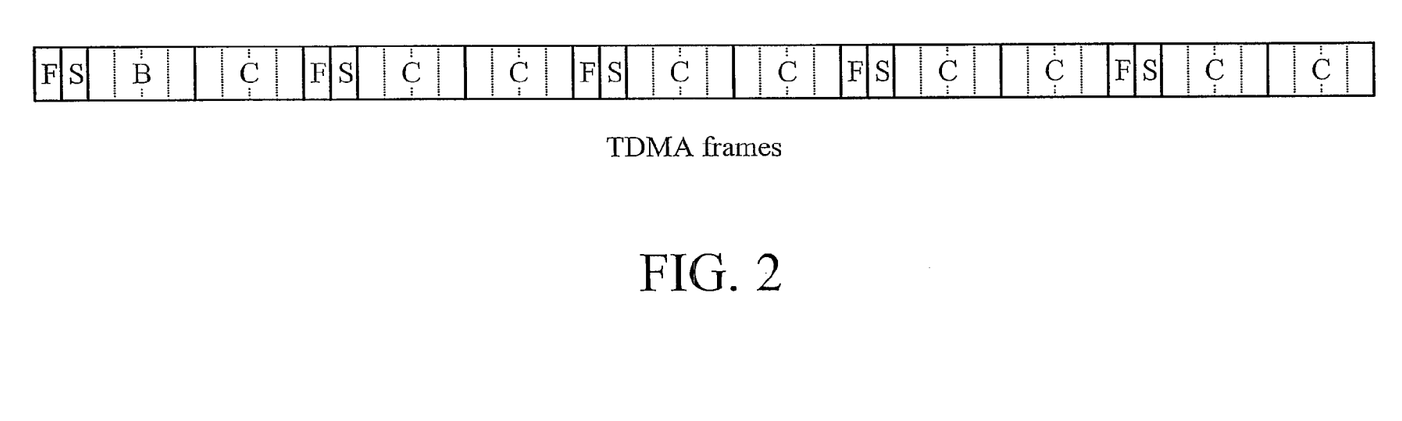
FIG. 2 shows a 235-ms multiframe comprising 51 TDMA frames according to the GSM transmission protocol.

During wireless data communication, the base stations 140 and 160 transmit data bursts to the mobile phones 142 and 144 in TDMA frames as depicted in FIG. 2. FIG. 2 shows a 235-ms multiframe comprising 51 TDMA frames according to the GSM protocol. Each TDMA frame has eight time slots corresponding to eight data bursts, equivalently to 408 data bursts for each multiframe. The data bursts belong to frequency correction channels FCCH (F), synchronization channels SCH (S), broadcast control channels BCCH (B), or common control channels CCCH (C).

The frequency correction channel FCCH data bursts do not contain training sequences, and comprises data burst of "zeros" so that the mobile station can correct the local oscillator frequency error. The synchronization channel SCH is a downlink channel comprising regular sequency of bits that enables the mobile stations to synchronise received frame boundaries with the base stations on registration. The common control channel CCCH transfers data bursts containing training sequences known to the mobile stations for timing synchronization, supporting common procedures to establish a dedicated link between the base station and the mobile station. In the GSM specification, eight training sequences for normal bursts are specified, each base station utilizes a fixed training sequence thereof on all channels. The training sequence in the CCCH data burst is shorter than that of the synchronization burst in SCH, thus the timing synchronization provided by the CCCH data is less accurate than that of the SCH data. In the GSM systems, the common control channel CCCH includes RACH (Random Access Channel) for initial access to the GSM network, PCH (Paging Channel) indicating incoming calls or messages on waiting for the mobile station, and AGCH (Access Grant Channel) assigning the GSM network resource to another mobile station requesting the network access. The broadcast control channel BCCH is a downlink channel containing specific parameters required by the mobile station to identify the base station and obtain network access through the base station.

Figure 3:
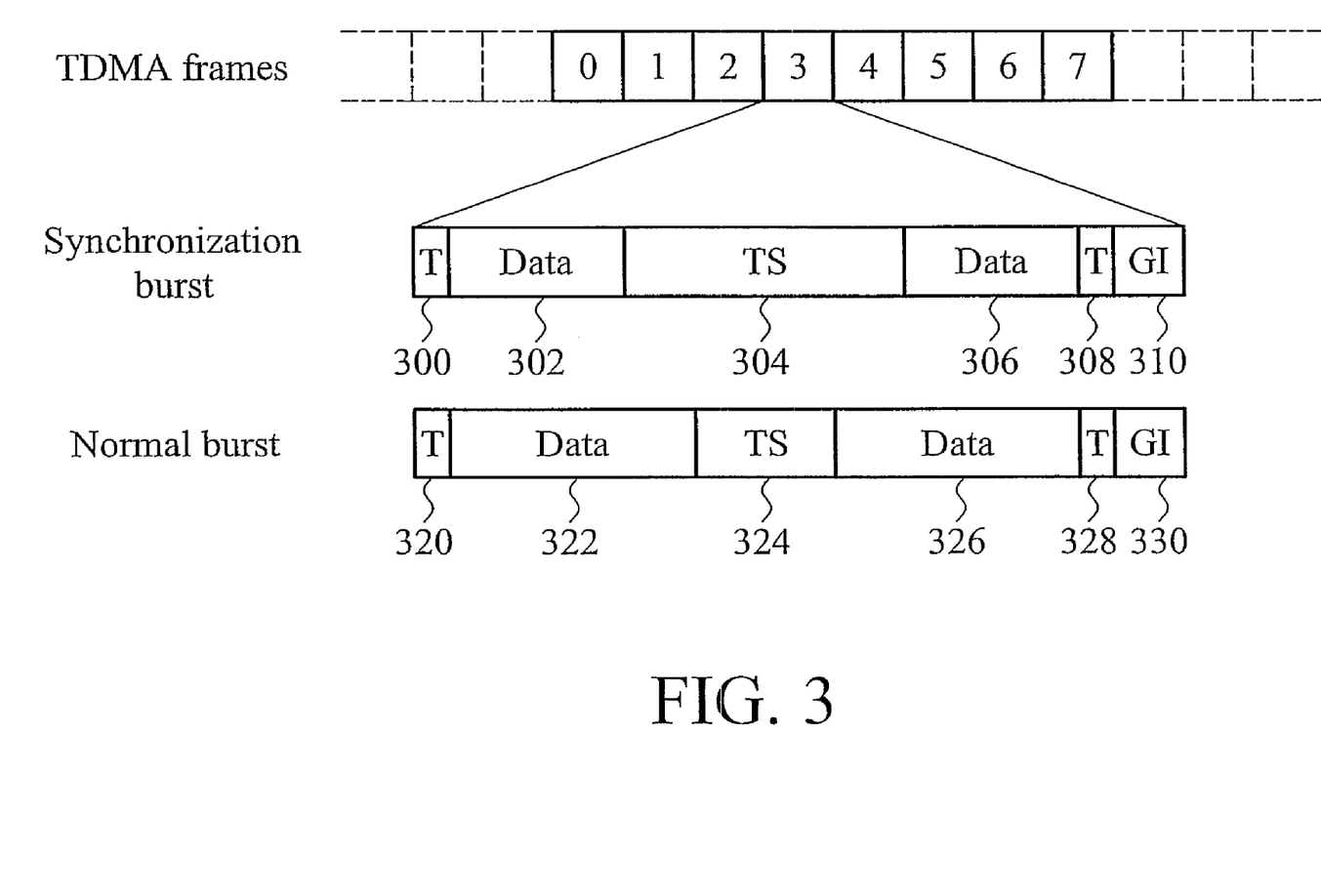
FIG. 3 shows data format for synchronization data burst and normal data burst compliant with the GSM transmission protocol.

FIG. 3 shows data format for synchronization data burst and normal data burst in TDMA frames compliant with the GSM transmission protocol. Each TDMA frame consists of eight time slots, each transmit one burst of one transmission channel, in which the information transmitted is encoded.

In the GSM specification, data bursts are defined in 3 types: synchronization data bursts, frequency correction data bursts and normal data bursts. The synchronization channel SCH data bursts are transmitted in synchronization burst format, comprising a 3-bit tail block 300, 39-bit data block 302, 64-bit training sequence TS 304, 39-bit data block 306, 3-bit tail block 308, and 8.25-bit guard period 310. The normal burst is used for transmission on traffic and signaling channels. For example, the broadcast control channels BCCH and common control channels CCCH are transferred in normal burst format, comprising a 3-bit tail block 320, 58-bit data block 322, 26-bit training sequence TS 324, 58-bit data block 326, 3-bit tail block 328, and 8.25-bit guard period 330. The frequency correction channels FCCH data bursts are sent in frequency burst format (not shown) comprising a fixed number of data bits that represents a sinus wave signal with a predefined frequency offset relative to the nominal RF channel.

The SCH, BCCH, and CCCH data bursts include training sequences that could be used for performing cross-correlation in the mobile station to compensate timing difference between the base stations and the mobile stations. Upon recipient of the SCH, BCCH, or CCCH data bursts, the mobile station extracts the training sequence thereof, computes cross-correlation between the extracted training sequence and the known sequence, and shifts the extracted training sequence in time to detect the maximal cross-correlation. The shifted time for maximal cross-correlation is used to synchronize a clock from a local oscillator of the mobile station with that of the base station.

Figure 4:
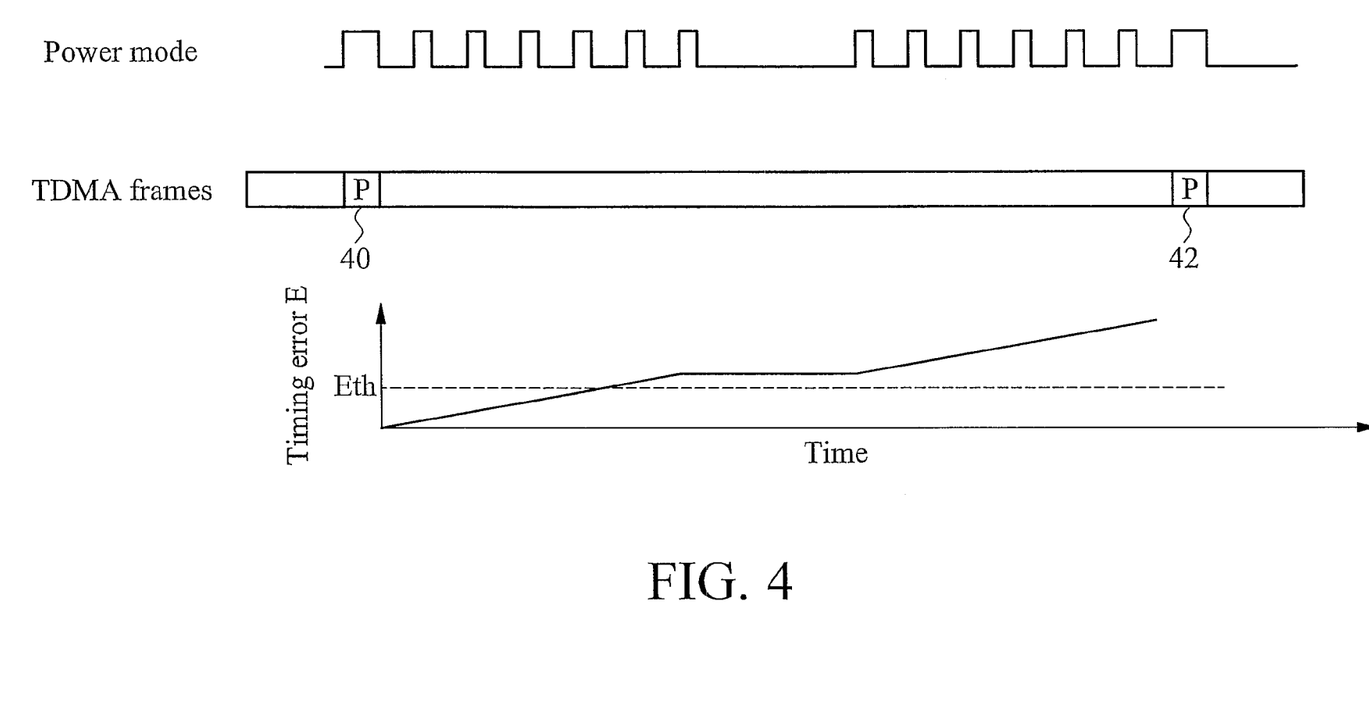
FIG. 4 illustrates the problem of timing error accumulation in a conventional mobile phone.

FIG. 4 illustrates an example of timing error accumulation problem in a conventional mobile phone, where the speed of a local clock in the mobile phone switching between two clock speeds is the main cause of the timing error E growth. As previously mentioned, a mobile phone employs a low clock speed during the power saving mode while using a high clock speed during the normal operation mode. For example, the local clock of the mobile phone runs at 13 MHz during the normal operation mode while operating at 32 KHz during the power saving mode. Referring to FIG. 4, the waveform for the power mode of the mobile phone comprises data "HIGH" and data "LOW", time periods corresponding to data "HIGH" represent operating under the normal operation mode and time periods corresponding to data "LOW" represent operating under the power saving mode. The mobile station receives one Paging Channel PCH data burst in a predetermined period, represented by symbol P in TDMA frames in FIG. 4. When the mobile station receives a Paging Channel PCH data burst, a training sequence is extracted therefrom to adjust the local clock of the mobile station so it is synchronized with the clock of the base station, and the timing error E of the local clock is reset. Each time when the local clock switches from low speed to high speed, a time shift is induced due to the low resolution of the low clock speed. As shown in FIG. 4, the timing error E, is accumulated over time such that the local clock in the mobile station is gradually out of synchronization with the base station.

In an embodiment, the 32 KHZ clock operated in the power saving mode is provided by a crystal with a clock speed between 32767 Hz to 32930 Hz. The timing error E produced by each power mode switch is evaluated according to the clock speed during the power saving mode. During the normal operation mode, the mobile station retrieves a TDMA frame comprising 5000 quarter bit (qbits) data in 4.615 ms by the 13 MHz local clock. During the power saving mode, the local clock is switched to low clock speed approximately at 32 KHz, thus the mobile station counts 151.219 32K-clock cycles in a 4.615 ms frame period if counting by 32767 Hz clock speed or 151.971 32K-clock cycles if counting by 32930 Hz clock speed. There are 33.11 qbits in each 32K-clock cycle if counting by 32767 Hz clock speed (5000/151.219=33.11258), or 33.91 qbits in each 32K-clock if counting by 32930 Hz clock speed (5000/151.917=32.9127), resulting in approximately an average of 0.5 qbit and a maximum of 1 qbit of qbit-error when each time the local clock switching from 32 KHz to 13 MHz for executing handset applications in the normal operation mode.

The local clock of the mobile station switches from low to high speeds when exiting the power saving mode and entering the normal operation mode, for example, the mobile station receives data bursts from other neighboring base stations to obtain neighboring information and synchronization information, or it compares signal strength of a plurality of strongest cells to determine whether handover is required, or executes IRQs triggered applications for the mobile station. In an example of the GSM system, a mobile station is required to receive the BCCH data bursts to check the system information for six neighboring base stations in every 5 minutes, and obtain the SCH data bursts to determine the synchronization information for six neighboring base stations every 30 seconds, consequently the mobile station needs to perform at least 12 times of the power mode switch every 5 minutes to collect the system information and synchronization information, resulting in a timing error of 12 qbits in 5 minutes. The mobile station receives a PCH data burst every 0.5~2.25 second for timing synchronization with the GSM network covered by the base station, depending on the PCH data burst timing setting of the network. In an embodiment, the mobile station is capable of correcting a timing error Eth less than 16 qbits. As the accumulated timing error exceeds the timing error threshold Eth (e.g. 16 qbits), the mobile station is unable to detect the PCH data burst accurately, the timing error E cannot be compensated and reset, and incoming or outgoing calls cannot be received or requested. In the exemplary embodiment illustrated in FIG. 4, the mobile station checks incoming calls and resets the timing error E by PCH data burst 40, enters the power saving mode after determining no incoming call in PCH data burst 40, wakes up to the normal operation mode when the mobile station is required to collect the system or synchronization information, or perform other IRQ triggered applications such as WiFi, Bluetooth, WLAN, and other applications, and returns to the power saving mode upon the completion of the applications. The timing error E is increment each time the local clock of the mobile station switches from the low clock speed to the high clock speed for retrieving data bursts or executing applications, eventually the timing error E exceeds the timing error threshold Eth, and the mobile station becomes so out of synchronization from the clock in the GSM system such that it is unable to determine the correct timing for detecting the next PCH data burst 42, consequently the mobile station cannot correct the timing error E and cannot operate accurately.

Figure 5:
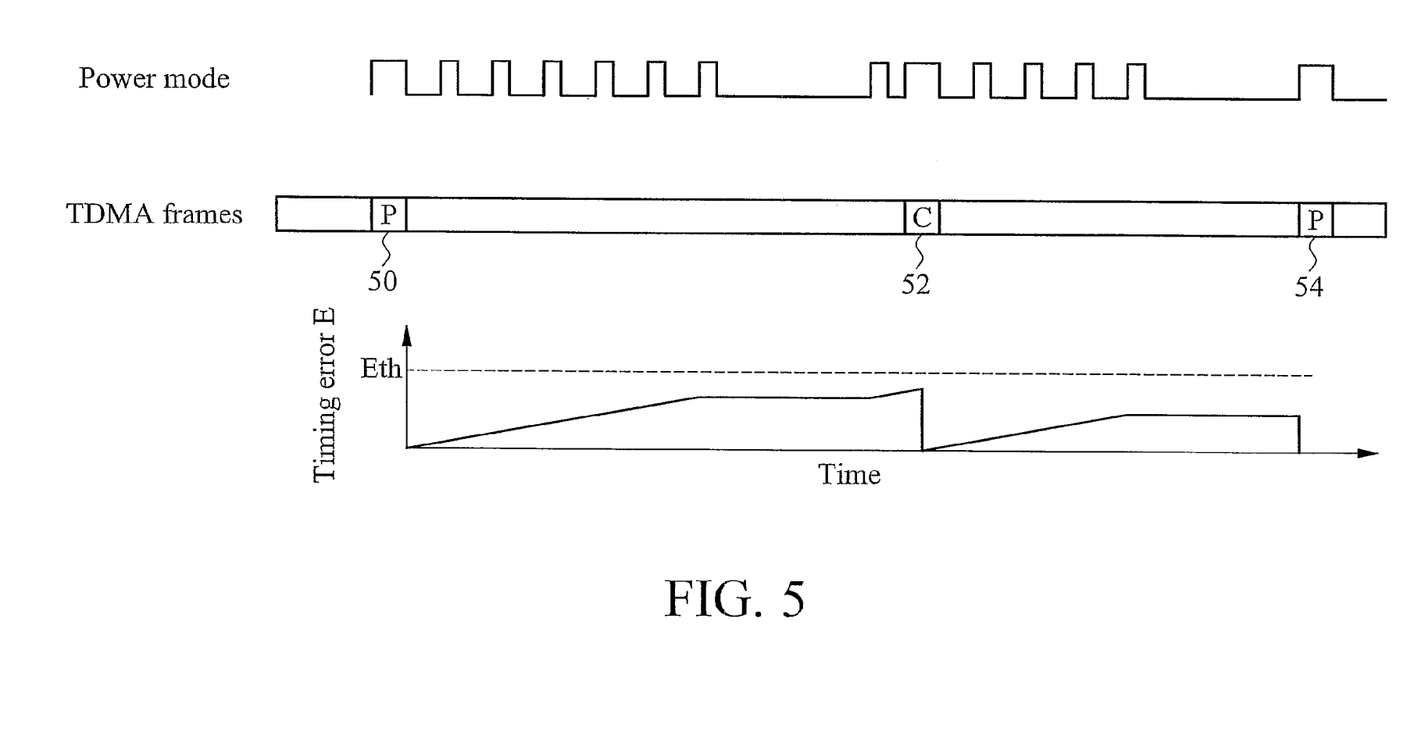
FIG. 5 illustrates a timing synchronization scheme according to an embodiment of the invention.

To solve the timing synchronization problem, a timing synchronization timing scheme is provided according to the embodiment in FIG. 5, incorporating the wireless telecommunication system in FIG. 1. In the embodiment, the timing synchronization timing scheme is to synchronize the timing between a clock of the base station 140 and the local clock of the mobile station 142.

As the mobile station 142 switches the power mode, it computes the accumulated timing error E according to a number of times that the mobile station clock switches from the low clock speed (first clock speed) to high clock speed (second clock speed) and compares the number of times of power mode switches with a predetermined number of power mode switches. The predetermined number of power mode switches is set to guard the accumulated timing error to exceed the threshold Eth, which depends on the processor's capability of training sequences detection. For example, when the number of times of power mode switches exceeds the predetermined number of power mode switches, the mobile station 142 may not be able to retrieve PCH data burst and correct the accumulated timing error E. Thus the mobile station 142 obtains a timing synchronization data burst when the number of times of power mode switches reaches the predetermined number of power mode switches to correct the timing error E, before the timing error E becomes uncontrollable.

In some embodiments, the predetermined number of times of power mode switches N can be calculated by:

$$N=(E\text{th}-\text{safe margin})/E\text{max};$$

where Eth is the timing error threshold discussed above, safe margin provides time margin to allow the mobile station still capable of decoding data blocks when some other circumstances also induce timing error, for example, the timing error existed in the signal sent by the network, and Emax is the maximum timing error that can be induced by one power mode switch.

The timing synchronization data burst can be a common control channels CCCH data burst that includes PCH (Paging Channel) data burst and AGCH (Access Grant Channel) data burst. The PCH data burst alerts the mobile station 142 a call or text message on waiting, also contains a training sequence that could be used for correcting the timing error E. The AGCH data burst assigns GSM network resources to all mobile stations requesting access to the network, including a dedicated channel to be used by the mobile station, along with timing information that could be used for timing synchronization with the network. The mobile station 142 retrieves a CCCH data burst and decodes the CCCH data burst to extract the training sequence thereof prior to excessive timing error E is accumulated in the mobile station clock. The mobile station 142 determines the timing error E between the base station clock and the mobile station clock using the extracted training sequence and a known training sequence therein, so that the timing error E can be compensated to restore timing synchronization between the mobile station 142 and the base station 140.

In the embodiment illustrated in FIG. 5, the waveform for the power mode of the mobile phone comprises data "HIGH" and data "LOW" which is similar to that of in FIG. 4. In the embodiment, the mobile station is only able to correct a timing error less than the timing error Eth (e.g. 16 qbits), and the predetermined number of power mode switches is 12. The mobile station receives a PCH data burst 50 to check the incoming calls and remove the timing error E, and then enters the power saving mode. As the mobile station 142 switches power modes to retrieve system or synchronization information, or executes applications or IRQ triggered events such as WiFi, Bluetooth, WLAN, and screen saving program, the timing error E is gradually increased. Therefore the mobile station 142 records the number of times of power mode switching between the two clock speed, compares the number of times of power mode switch with the predetermined number of power mode switches, receives a CCCH data burst 52 when the number of times of power mode switch reaches the predetermined number of power mode switch, decodes the CCCH data burst 52 to determine the timing error E, and compensates the clock of the mobile station to reduce the timing error E, so that the mobile station 142 would not become so out of synchronous that it cannot retrieve and decode the PCH data burst 54 accurately.

Figure 6:
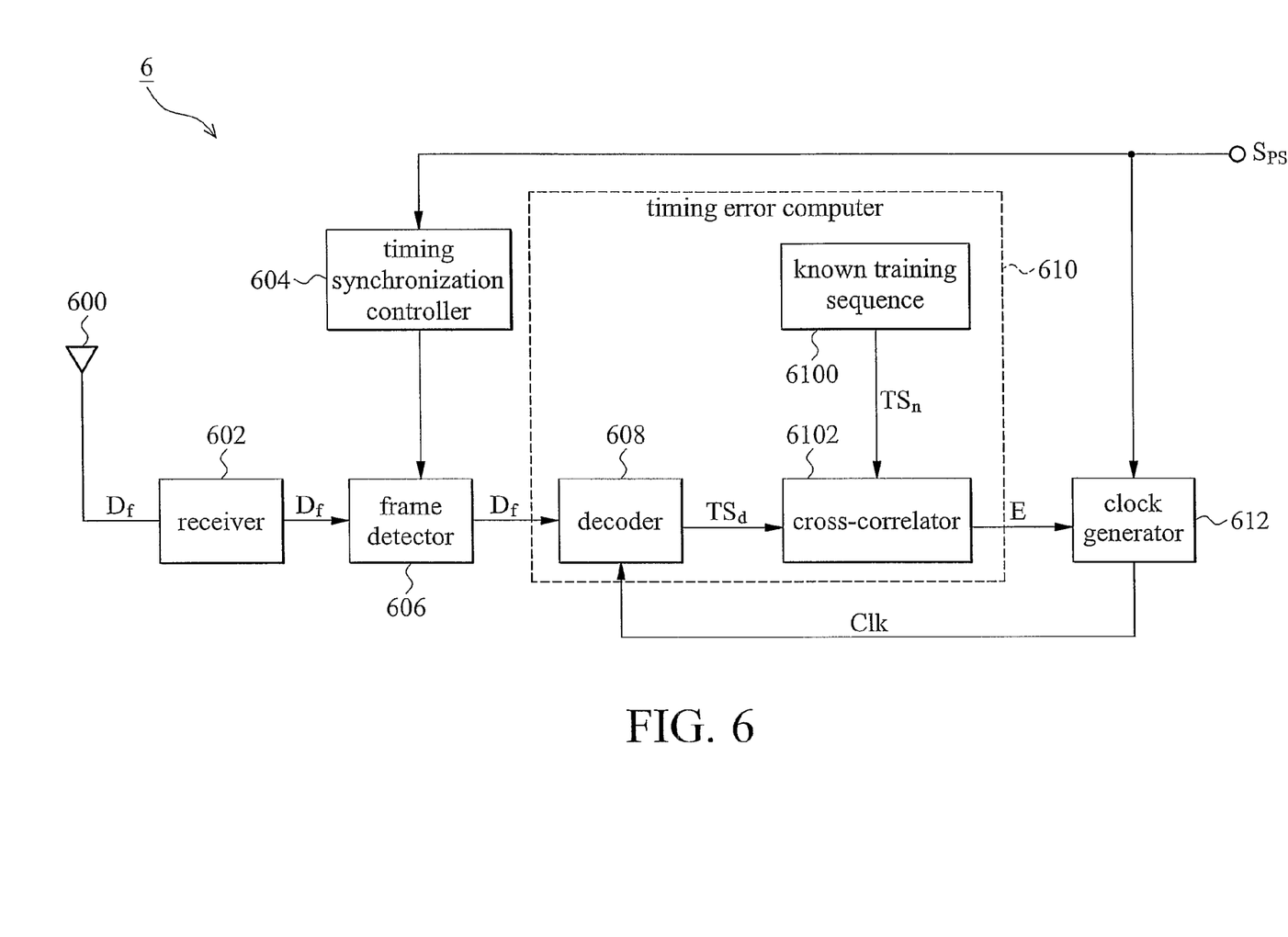
FIG. 6 is a block diagram of a mobile station 6 capable of timing synchronization according to an embodiment.

FIG. 6 is a block diagram of a mobile station 6 capable of maintaining timing synchronization between a base station clock and a mobile station clock according to an embodiment of the invention. The mobile station 6 comprises antenna 600, receiver 602, timing synchronization controller 604, frame detector 606, decoder 608, timing error computer 610, and clock generator 612. Antenna 600 is coupled to receiver 602, and receiver 602 in conjunction with timing synchronization controller 604 is coupled to frame detector 606, decoder 608, timing error computer 610, and clock generator 612.

Antenna 600 receives RF signals containing GSM data bursts Df from air and passes to receiver 602 for data sampling to produce digitized data bursts. Clock generator 610 generates a mobile station clock according to a power mode for uses in digital circuits in the mobile station. The power modes can be a normal operation mode that runs at a high clock speed, for example, 13 MHz, or a power saving mode runs at a low clock speed, for example, 32 KHz. The normal operation mode is utilized when mobile station 6 processes received data bursts or performs application programs. The power saving mode is used to reduce power usage of mobile station 6 when it is idle. Mobile station 6 exits the power saving mode when receiving a data block to decode system information of the base station or neighboring base stations, or when executing an application program of the mobile station. Timing synchronization controller 606 determines a number of times of the mobile station clock switching from a first clock speed to a second clock speed, and compares the number of times of mobile station clock switching with a predetermined number of clock speed switch. In this embodiment, the second clock speed is faster than the first one. The first clock speed is the 32 KHz low clock speed, and the second clock speed is the 13 MHz high clock speed. Timing synchronization controller 604 comprises a counter (not shown) that increment the number of switching occurred when the mobile station exits a power saving mode. Frame detector 604 receives and detects a CCCH block when the number of times of mobile station clock reaches the predetermined number of clock switch. The CCCH block can be a PCH (Paging Channel) data burst or AGCH (Access Grant Channel) block comprising training sequences known by mobile station 6. Decoder 608 decodes the CCCH block to determine the transmitted training sequence. Timing error computer 610 computes a timing error between the base station clock and the mobile station clock according to the training sequence. Clock generator 610 in turn receives the timing error to compensate for the mobile station clock.

Frame detector 606 may further receive a BCCH block in SCH data burst format when the number of times of clock speed switch is less than the predetermined number of clock switch, and timing error computer 610 decodes the BCCH block to determine a timing error between the base station clock and the mobile station clock. The BCCH block also contains a training sequence that could be used for timing synchronization.

Timing error computer 610 comprises training sequence decoder 608, register 6100, and cross-correlator 6102. Training sequence decoder 608 and register 6100 are both coupled to cross-correlator 6102. Training sequence decoder 608 decodes the transmitted training sequence according to the CCCH block or the BCCH blocks. Register 6100 can be a memory, a buffer, or any storage circuit store a known training sequence in the mobile station according to the frame type, which can be 26-bit for PCH, AGCH, or BCCH blocks. Cross-correlator 6102 computes a first cross-correlation according to the transmitted training sequence and the known training sequence, shifts the transmitted training sequence in time to compute a second, third, ... cross-correlations according to the shifted training sequence and the known training sequence, and determines the timing error by the shifted time corresponding to the highest cross-correlation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of timing synchronization between a base station clock and a mobile station clock, comprising:
   determining a number of times of the mobile station clock switching from a first clock speed to a second clock speed;
   comparing the number of times of the mobile station clock switching with a predetermined number of clock speed switches;
   receiving a control channel block when the number of times of clock speed switches reaches the predetermined number of clock speed switches;
   decoding the control channel block to determine a timing error between the base station clock and the mobile station clock; and
   compensating the timing error for the mobile station clock;
   wherein the determination of the timing error comprises:
   decoding a transmitted training sequence according to the control channel block;
   computing a first cross-correlation according to the transmitted training sequence and a known training sequence;
   shifting the transmitted training sequence in time to compute a second cross-correlation according to the shifted transmitted training sequence and the known training sequence; and
   determining the timing error corresponding to a maximum cross-correlation.

2. The method of claim 1, wherein the control channel block is a common control channel (CCCH) block comprising a PCH (Paging Channel) or AGCH (Access Grant Channel) block.

3. The method of claim 1, wherein the control channel block is a Broadcast Control Channel (BCCH) block.

4. The method of claim 1, wherein the determination of the number of the switching time comprises:
   a counter increasing the number of time of the mobile station exits a power saving mode, where the power saving mode reduces power usage of the mobile station.

5. The method of claim 4, wherein the mobile station exits the power saving mode when receiving a data block to decode system information of the base station or neighboring base stations.

6. The method of claim 4, wherein the mobile station exits the power saving mode when executing an application program of the mobile station.

7. The method of claim 1, wherein the first clock speed is a low clock speed and used in a power saving mode to reduce power usage of the mobile station, and the second clock speed is a high clock speed.

8. A mobile apparatus capable of performing timing synchronization to a base station, comprising:
   a timing synchronization controller determining a number of times of the mobile station clock switching from a first clock speed to a second clock speed, and comparing the number of times of the mobile station clock switching the clock speed with a predetermined number of clock speed switches;
   a frame detector, coupled to the timing synchronization controller, receiving a control channel block when the number of times of clock speed switches reaches the predetermined number of clock speed switches;
   a timing error computer, coupled to the frame detector, decoding the control channel block to compute a timing error between the base station clock and the mobile station clock; and a clock generator, coupled to the decoder, receiving the timing error to compensate for the mobile station clock;

wherein the timing error computer comprises:

a training sequence decoder, decoding a transmitted training sequence according to the control channel block;

a register, storing a known training sequence in the mobile station;

a cross-correlator, coupled to the training sequence decoder and the register, computing a first cross-correlation according to the transmitted training sequence and the known training sequence, shifting the transmitted training sequence in time to compute a second cross-correlation according to the shifted transmitted training sequence and the known training sequence, and determining the timing error from the time shift corresponding to a maximum cross-correlation.

9. The mobile apparatus of claim 8, wherein the control channel block is a common control channel (CCCH) block comprising a PCH or AGCH block.

10. The mobile apparatus of claim 8, wherein the control channel block is a BCCH block.

11. The mobile apparatus of claim 8, wherein the timing synchronization controller comprises:

a counter increasing the number of the time for the mobile station to exits a power saving mode, where the power saving mode reduces power usage of the mobile station.

12. The mobile apparatus of claim 11, wherein the mobile station exits the power saving mode when receiving a data block to decode system information of the base station or neighboring base stations.

13. The mobile apparatus of claim 11, wherein the mobile station exits the power saving mode when executing an application program of the mobile station.

14. The mobile apparatus of claim 8, wherein the first clock speed is a low clock speed and used in a power saving mode to reduce power usage of the mobile station.

* * * * *